(12) United States Patent
Jawaharlal et al.

(10) Patent No.: US 9,894,578 B1
(45) Date of Patent: Feb. 13, 2018

(54) MOBILE TELEPHONE NETWORK ABSTRACTION

(71) Applicant: INTERNATIONAL BUSINESS MACHINES CORPORATION, Armonk, NY (US)

(72) Inventors: Samuel M. Jawaharlal, Chennai (IN); Arunachalam Narayanan, Chennai (IN); Sathya Santhar, Chennai (IN); Balamurugaramanathan Sivaramalingam, Ramanathapuram (IN); Mukundan Sundararajan, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 15/333,553

(22) Filed: Oct. 25, 2016

(51) Int. Cl.
*H04W 36/14* (2009.01)
*H04W 36/18* (2009.01)
*H04W 36/30* (2009.01)
*H04L 29/08* (2006.01)
*H04W 36/00* (2009.01)

(52) U.S. Cl.
CPC .............. *H04W 36/14* (2013.01); *H04L 67/10* (2013.01); *H04W 36/0022* (2013.01); *H04W 36/18* (2013.01); *H04W 36/30* (2013.01)

(58) Field of Classification Search
CPC .................................................... H04W 36/14
USPC ................................................. 455/442–446
See application file for complete search history.

(56) References Cited

U.S. PATENT DOCUMENTS

| 5,915,214 | A  | 6/1999  | Reece et al. |
| 8,654,683 | B2 | 2/2014  | Lu et al. |
| 8,654,953 | B2 | 2/2014  | Boss et al. |
| 8,725,800 | B1 | 5/2014  | Chan et al. |
| 8,934,887 | B2 | 1/2015  | Dgani et al. |
| 2007/0206762 | A1* | 9/2007 | Chandra ................. H04L 65/80 379/220.01 |
| 2011/0317827 | A1* | 12/2011 | Olsen .................. H04M 7/0075 379/220.01 |
| 2012/0331532 | A1 | 12/2012 | Walters et al. |

(Continued)

FOREIGN PATENT DOCUMENTS

| CN | 104486818 A | 4/2015 |
| EP | 2728962 A1 | 5/2014 |

OTHER PUBLICATIONS

Peter Mell et al, The NIST Definition of Cloud Computing, National Institute of Standards and Technology, U.S. Department of Commerce, Special Publication 800-145, 2011.
Mozilla Developer Network and Individual Contributors, Get started with B2G OS add-ons, Transition Branches, 2005-2016.
Team Aerohive In, Cloud Managed Vs. Cloud Controlled Wi-Fi: What's the Difference?, Aerohive Networks, 2013.

(Continued)

*Primary Examiner* — Michael T Vu
(74) *Attorney, Agent, or Firm* — Patrick J. Daugherty; Driggs, Hogg, Daugherty & Del Zoppo Co., LPA (57) ABSTRACT

Aspects dynamically switch between different cellular service providers that use different ones of cellular signal encoding standards during a cellular call. A cellular phone call established from an end user device to another user on a first cellular service provider. In response to determining that the performance attributes of the first cellular service provider fail to meet the boundary values, while maintaining the established cellular phone call from the end user device to the other user without dropping the established call, or a connection of the end user to the established call, the call is automatically switched to a different (second) cellular service provider that has performance attributes meeting the boundary values and using a different cellular signal encoding standard relative to the first cellular service provider.

20 Claims, 5 Drawing Sheets

(56) References Cited

U.S. PATENT DOCUMENTS

| | | |
|---|---|---|
| 2013/0007203 A1 | 1/2013 | Szu et al. |
| 2014/0136662 A1 | 5/2014 | Chan et al. |
| 2014/0297823 A1 | 10/2014 | Prakash et al. |
| 2014/0301247 A1* | 10/2014 | Yan .................. H04M 3/38 370/259 |
| 2014/0328190 A1 | 11/2014 | Lord et al. |
| 2015/0244741 A1 | 8/2015 | Sinha et al. |
| 2015/0264544 A1 | 9/2015 | Lu et al. |

OTHER PUBLICATIONS

Toktam Mahmoodi et al, On Using a SDN-based Control Plane in 5G Mobile Networks, Wireless World Research Forum, 2014.
VMTurbo, Inc., VMTurbo as a Cloud Control Plane, 2016.
Sprint, Sprint In-Home Coverage Solutions, 2016.
Muhammad Shiraz et al, A Study on Anatomy of Smartphone, Computer Communication & Collaboration, 2013.
Saeid Abolfazli et al, Cloud-Based Augmentation for Mobile Devices: Motivation, Taxonomies, and Open Challenges, 2013.
Cloud Times, Mobile Cloud, The Power of the Cloud, 2010-2015.
MS Snehal P. Warhekar et al, Mobile Cloud Computing: Approaches and Issues, 2013.
David Linthicum, Mobile's next great leap will happen in the cloud, InfoWorld, 2014.
Kuljeet Kaur et al, Optimization of Mobile Applications in Mobile Cloud Computing (MCC), 2015.

\* cited by examiner

MOBILE TELEPHONE NETWORK ABSTRACTION

BACKGROUND

Cellular or mobile phone devices are radio devices operated by users to place and receive calls using wireless provider networks. Such networks use low-powered radio transmitters to define mobile telephone systems, with each transmitter covering a distinct geographical area or "cell." Computerized network equipment enables the hand-off or switching of a "call" (a generally two-way connection from one phone to another) from one area to another, thus enabling either phone to move from one cell area to another during the call without interrupting or losing the connection between the phones. This structure enables service providers to provide large-scale geographic coverage to users via their individual mobile phones.

It is desirable to design a mobile phone to be compact and portable. However, meeting the needs of users in conducting calls with other users, and in the case of "smart phone" also performing personal digital assistant (PDA) and other data processing tasks, requires cellular phone devices to incorporate a variety of in-built components and functionalities to connect to cellular service and other data providers (for example, radio transmitters and receivers, as well as Wireless Fidelity ("WiFi") and other wireless node connection components).

Central processing units (CPU's) and memory components must be included for performing data processing, and also for executing call processes required by network providers. Cell phones must generally include Subscriber Identity Module (SIM) card structures for uniquely identifying the phone and thereby authorizing connection to a given cellular provider network.

Specific and different components are generally required to be present within the mobile phone to enable radio channel access, communication and connection to different cellular provider networks via different signal encoding standards. Illustrative but not limiting or exhaustive examples of signal encoding standards include time division multiple access (TDMA), frequency division multiple access (FDMA), code division multiple access (CDMA), orthogonal frequency division multiple access (OFDMA), High Speed Packet Access (HSPA), Public Data Network (PDN), Long-Term Evolution (LTE), Global System for Mobile Communications (GSM) and third-generation mobile networks (3G), and still other encoding standards will be apparent to one skilled in the art.

Other structures required within a mobile phone include audio speakers and microphones for receiving and sending audio data during a call, and batteries for providing operative power, along with associated modules and components that enable their functioning.

Accordingly, the design of a cellular phone must often balance the competing objectives of maintaining a small, portable and easy-to-use physical form figure, while also having the robust processing capabilities to meet the needs and desires of the end user in interacting with cellular providers and other wired and wireless data networks and connections.

BRIEF SUMMARY

In one aspect of the present invention, a computerized method for dynamically switching between different cellular service providers during a cellular call executes steps on a computer processor. Thus, a cellular phone call is established from an end user device to another user on a (first) cellular service provider that is selected in response to having performance attributes that meet each of a set of a plurality of different boundary attribute values that are specified for execution of the cellular phone call. One or more of the boundary attribute values are revised to generate a revised set of boundary attribute values. Accordingly, in response to determining that the performance attributes of the first cellular service provider do not meet the revised set of boundary attribute values, while maintaining the established cellular phone call from the end user device to the another user without dropping the established call, or a connection of the end user to the established call, the established cellular phone call is automatically switched to a different (second) cellular service provider that has performance attributes meeting the revised set of boundary attribute values, and that uses a different cellular signal encoding standard relative to the first cellular service provider.

In another aspect, a system has a hardware processor in circuit communication with a computer readable memory and a computer-readable storage medium having program instructions stored thereon. The processor executes the program instructions stored on the computer-readable storage medium via the computer readable memory and thereby establishes a cellular phone call is from an end user device to another user on a (first) cellular service provider that is selected in response to having performance attributes that meet each of a set of a plurality of different boundary attribute values that are specified for execution of the cellular phone call. One or more of the boundary attribute values are revised to generate a revised set of boundary attribute values. Accordingly, in response to determining that the performance attributes of the first cellular service provider do not meet the revised set of boundary attribute values, while maintaining the established cellular phone call from the end user device to the another user without dropping the established call, or a connection of the end user to the established call, the established cellular phone call is automatically switched to a different (second) cellular service provider that has performance attributes meeting the revised set of boundary attribute values and that uses a different cellular signal encoding standard relative to the first cellular service provider.

In another aspect, a computer program product for dynamically switching between different cellular service providers during a cellular call has a computer-readable storage medium with computer readable program code embodied therewith. The computer readable hardware medium is not a transitory signal per se. The computer readable program code includes instructions for execution which cause the processor to establish a cellular phone call is from an end user device to another user on a (first) cellular service provider that is selected in response to having performance attributes that meet each of a set of a plurality of different boundary attribute values that are specified for execution of the cellular phone call. One or more of the boundary attribute values are revised to generate a revised set of boundary attribute values. Accordingly, in response to determining that the performance attributes of the first cellular service provider do not meet the revised set of boundary attribute values, while maintaining the established cellular phone call from the end user device to the another user without dropping the established call, or a connection of the end user to the established call, the established cellular phone call is automatically switched to a different (second)

cellular service provider that has performance attributes meeting the revised set of boundary attribute values and that uses a different cellular signal encoding standard relative to the first cellular service provider.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
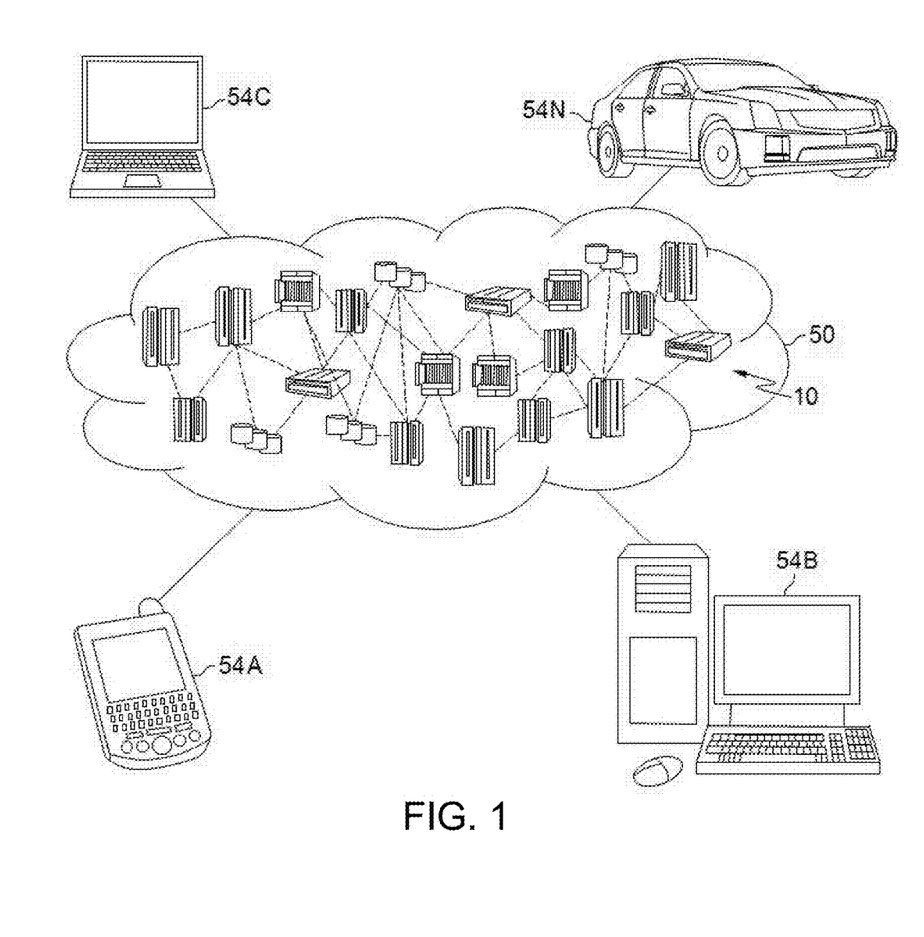
FIG. 1 depicts a cloud computing environment according to an embodiment of the present invention.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
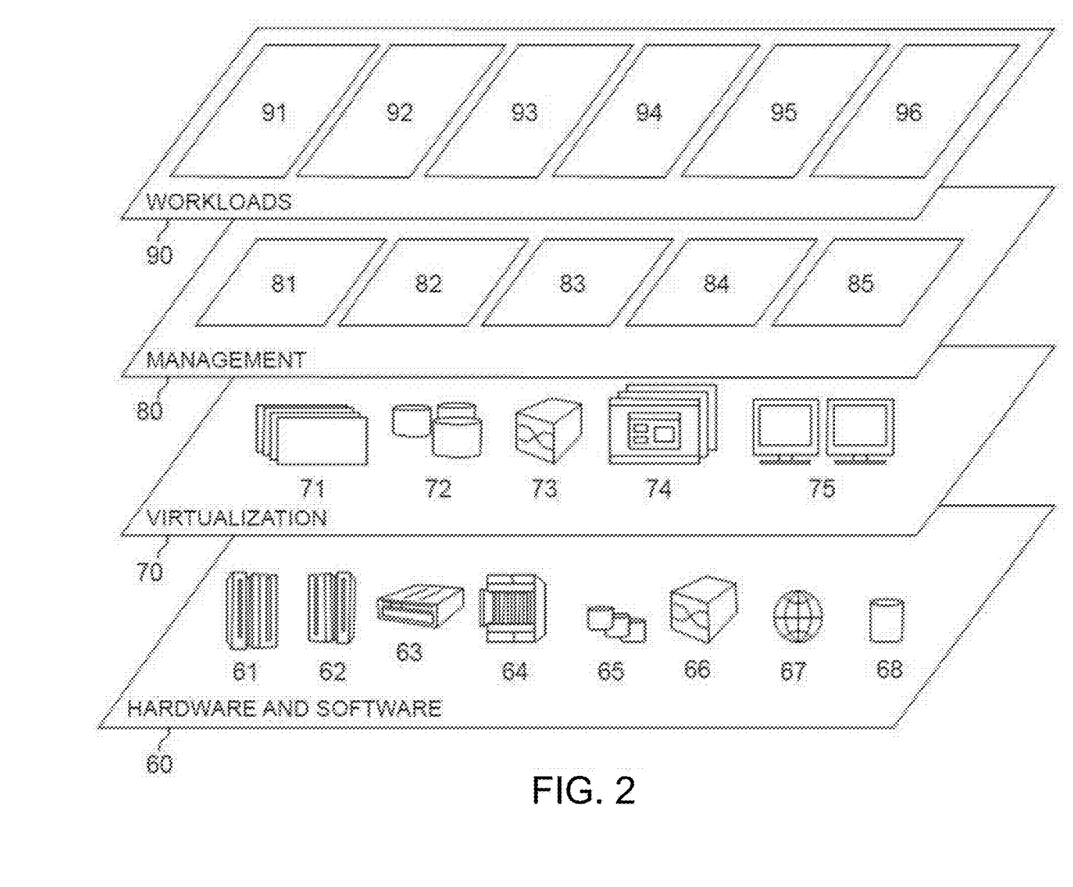
FIG. 2 depicts a cloud computing node according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Figure 4:
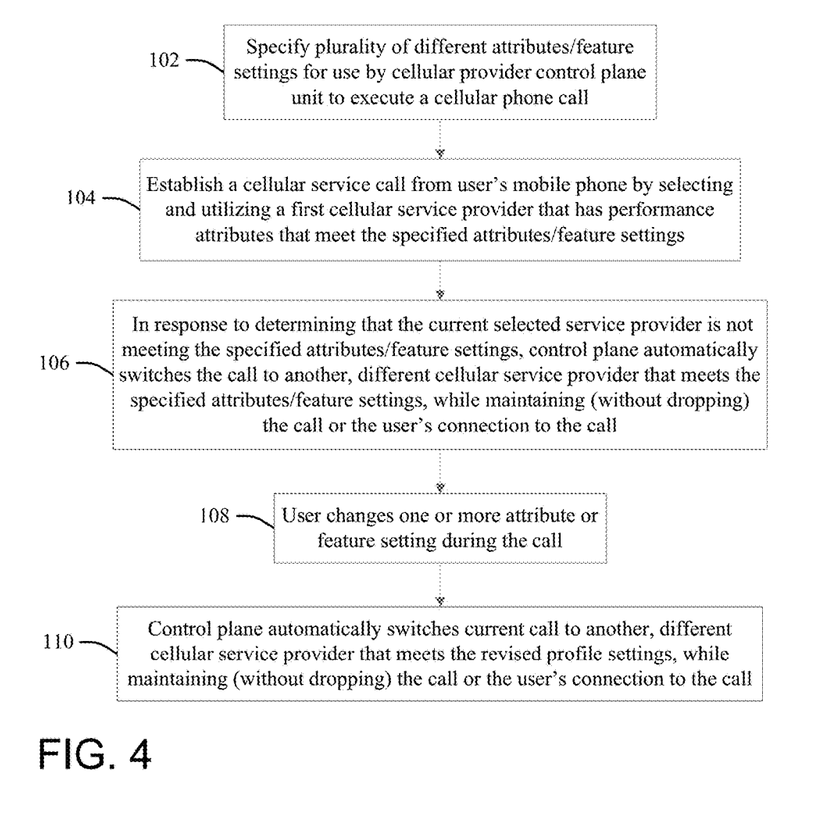
FIG. 4 is a flow chart illustration of a process or system for dynamically switching between different cellular service providers during a cellular call according to an embodiment of the present invention.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing 96 according to embodiments of the present invention, for example to execute the process steps or system components or tasks as depicted in FIG. 4 below.

Figure 3:
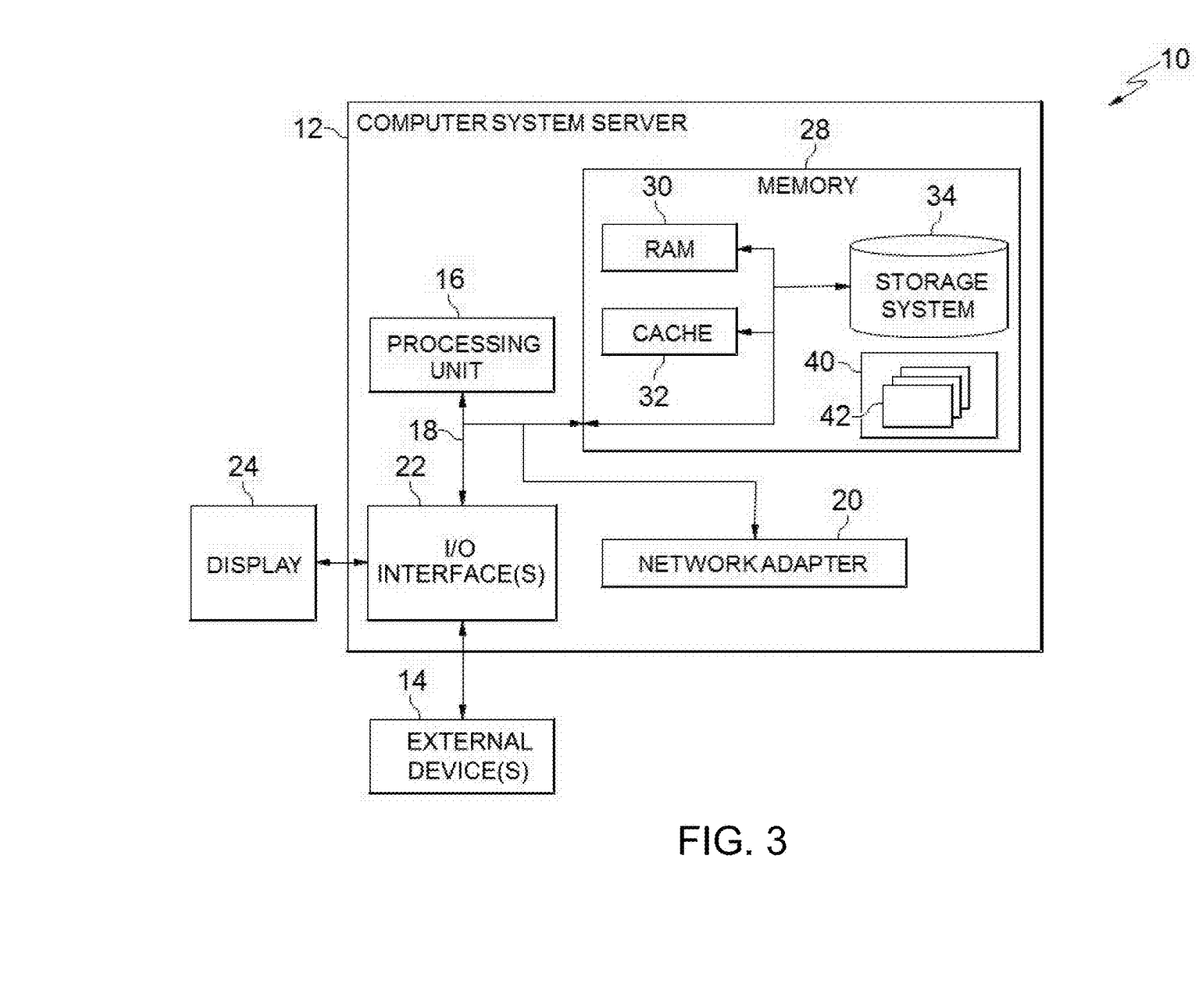
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

FIG. 4 illustrates a process or system according to the present invention for dynamically switching between different cellular service providers during a cellular call. At 102 a user specifies a plurality of different attribute or feature settings (for example, via a profile manager interface) for execution of a cellular phone call on a cellular provider network. More particularly, the attribute or feature settings are used by cellular provider control plane unit according to the present invention to select cellular providers and/or adjust call behavior. Some aspects of the present invention provide cloud-based cellular provider control plane units that are external and separate from, and in wireless communication with, a user's mobile phone device, which provides advantages in reducing the physical form of a given mobile phone device used by the user to place calls on a given cell phone provider, as is discussed below.

In one aspect the plurality of different attribute or feature settings set by the user at 102 include a priority setting for the calls: for example, high, medium or low priority, wherein higher priority levels may result in higher charges for calls made relative to lower priority settings, as service providers meeting priority demands may charge higher fees than service providers who agree to provide less-reliable connection services for lower priority services. Settings may also include general data transmission connection attributes, including an acceptable packet loss setting (for example, zero, 0.004, or 0.0005 packets per second, or some other specification); an assured bandwidth value (for example, 90%, 80%, 70%, etc.); and jitter values, for example as a percentage, fraction or other value of an ideal period of a bit or other value based on a Unit Interval ("UI"), such as zero %, 30 milliseconds, etc.).

Settings at 102 may also include preferred cellular signal encoding standards for devices that have the capability to communicate via multiple standards (TDMA, FDMA, CDMA or OFDMA, etc.). Still other quantifiable service attributes appropriate for setting at 102 and using for distinguishing between different cellular service providers will be apparent to one skilled in the arts.

At 104 a cellular service call is established for an end user device to another user by selecting a first cellular service provider (from a universe of available providers) that has performance attributes that meet the attribute or feature settings specified at 102.

At 106, during the established call, the process or system determines that the selected service provider is not meeting the specifications set at 102, (for example, due to service level agreement (SLA) specification change wherein available network bandwidth drops below a minimum threshold of the specified settings, etc.). In response the control plane automatically switches the current call to another, different (second) the target provider who meets the profile settings, while maintaining the current call (without dropping the call and requiring any party on the call to manually re-establish the call or a connection to the call).

At 108 the user changes one or more of the specification set at 102 during the call, and in response at 110 the control plane automatically switches the current call to another, different (second or third) cellular service provider who meets the revised profile settings, while maintaining (without dropping) the call or the user's connection to the call.

In one example of application of the process or system of FIG. 4, the user has set high priority at 102 for all calls before joining a conference call at 104, which requires selection of a high-cost service provider at 104 to establish the connection to the conference call. During the conference call the user determines that he or she is going to speak for the first 10 minutes only, and that for remainder time (the rest) of the call it is not very important to the user to maintain priority connection service to the call. Accordingly, during the call and after the ten minute point, at 108 the user revises the preference settings (for example, via setting a flag in the control plane), thereby changing the priority setting to medium or low, which enables the process or system control plane to switch the call at 110 to a lower cost service provider, wherein the user has indicated that he or she accepts the revised connection with lower reliability in consideration for lower charges. Thus, automated control plane aspects according to the present invention dynamically select the right service provider to initiate a handover (for example, via a network selection unit) while the user is on the call, based on matching determined network usage, available bandwidth, network coverage, packet loss, latency data performance to the user's dynamic preference settings.

Figure 5:
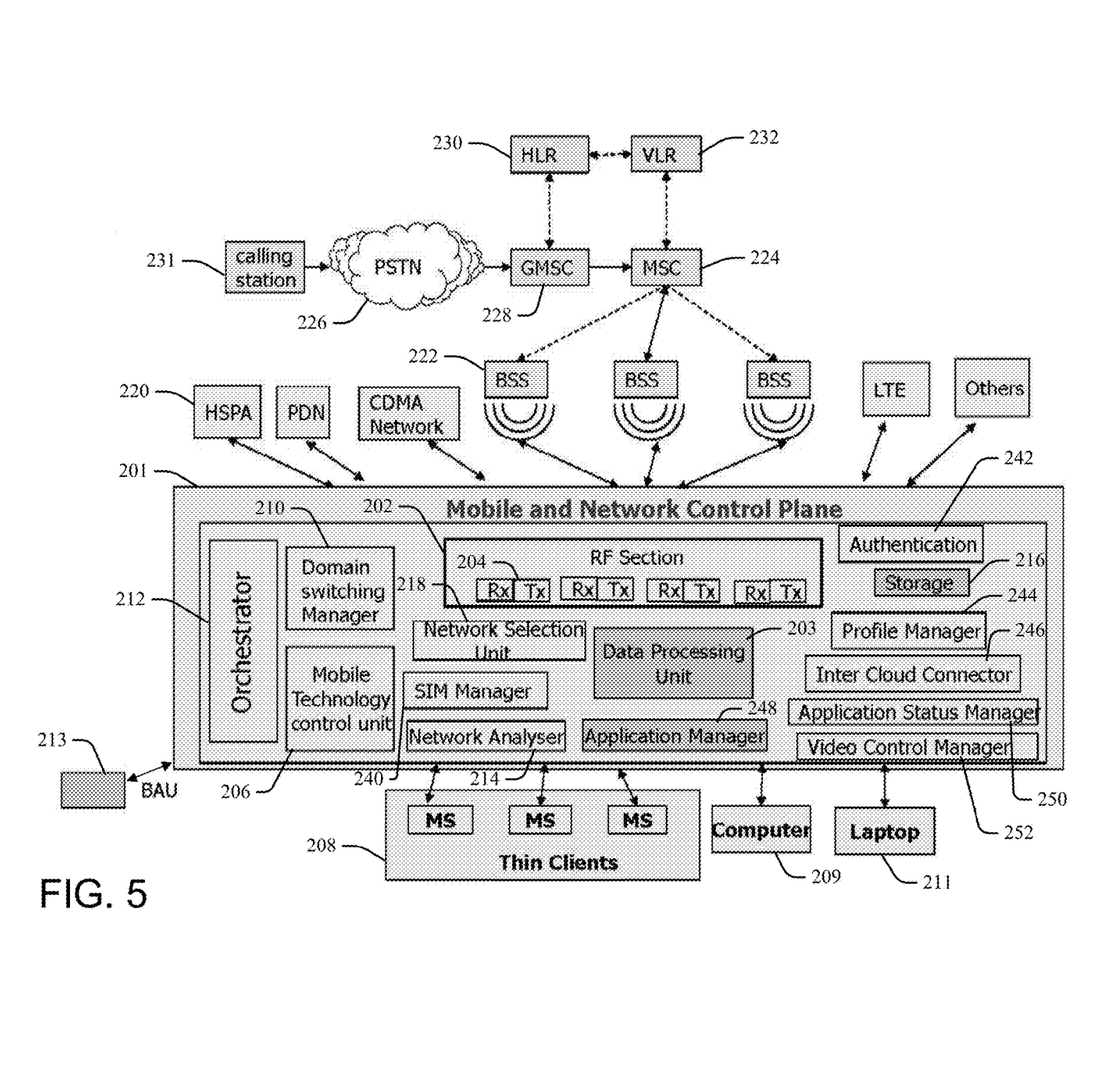
FIG. 5 is a block diagram illustration of an exemplary cloud-based control plane system according to an aspect of the present invention.

FIG. 5 is a block diagram illustration of an exemplary cloud-based control plane system 201 according to the present invention that has data processing capabilities as enabled by a data (central) processing unit 203. In a radio frequency (RF) section 202 the radio antennas of mobile devices are abstracted to a single antenna connecting to a frequency set by a cloud RF section. Multiple transmitter ("Tx")/receiver ("Rx") components 204 are provided for communication links via each of a wide range of different frequency bands, standards and protocols. Thus, under control by a mobile technology control unit 206 the RF section 202 is enabled to connect to a variety of diverse cellular provider networks 220 having different signal encoding standards including HSPA, PDN, CDMA, LTE, and GSM.

A variety of thin clients ("MS") 208, desktop computers 209 and laptop computers 211 may also connect to the control plane 201 via the RF section 202 via WiFi or other wireless standards, including Bluetooth™ via) or a Universal BLUETOOTH Adapter (BAU) 213, or via wired connections (not shown). (BLUETOOTH is a trademark of Bluetooth SIG in the United States or other countries.)

Base-Station Subsystem (BSS) radio components 222 of a wireless local area network (WLAN) connect to the control plane 201 via the RF section 202, wherein interfaces and procedures for communicating with the BSS components 222 are defined through IEEE 802.11 standards for making a call or other radio connection to the calling station 231 of another user. A mobile switching services center (MSC) 224 serves as a normal switching node and interface to a public switched telephone network (PSTN) 226 via a Gateway Mobile Switching Center (GMSC) 228, the point to which a terminating call to or from said other user calling station 231 is initially routed. The GMSC 228 obtains a MSRN (Mobile Station Roaming Number) from a Home Location Register (HLR) 230, a database containing administrative information about cellular subscribers along with their last known location. A Visitor Location Register (VLR) 232 contains selected information from the HLR 230 that enables selected services for an individual subscriber to be provided.

The mobile technology control unit 206 works hand-in-hand with the RF section 202 to connect to different mobile/cellular signal encoding technology standards (for example, GSM, HSPA, CDMA, etc.) to enable soft handovers from one technology standard to another while on a call based on user's preferences, and also while in a connection to a common base station or wireless node (for example, a wireless WiFi hub within a room or building or other geographically-defined range), wherein multiple mobile devices may connect to the base/hub and thereby utilize a single connection to cloud services.

A domain switching manager 210 manages switching of processes from one domain to another, for example from a circuit switching domain to a packet switching domain, based on compliance with various factors (as specified at 102, FIG. 4). Illustrative but not limiting or exhaustive examples of the factors include network bandwidth conditions, signal coverage, user's cost or priority preferences or requirements, threshold reliability, and relative importance of call or portion thereof.

An orchestrator 212 gets inputs including from a network usage analyzer 214, user's preferences and other internal data from an internal storage device 216, and responsively drives the mobile technology control unit 206, the domain switching manager 210 and a network selection unit 218 to perform their various functions based on the operational needs.

The network selection unit 218 is responsible for handover of calls from one service provider's network 220 to another based on the inputs from orchestrator 212 while the user is on a call. The network selection unit 218 identifies a target network 220 based on the compliance of various parameters with the user settings (for example, network usage, available bandwidth, network coverage, packet loss, latency data as determined by the network analyzer 214).

The network analyzer 214 keeps track of network parameters of various current or available service providers (for example, latency, jitter, signal loss, bandwidth, etc.) and performs a predictive analysis to help the other units of the cloud plane 201 switch to an appropriate network 220.

A SIM Manager 240 abstracts SIM functionality of mobile devices to the control plane 201 so that end devices can connect to any type of network through SIM. This provides efficiencies over the prior art by enabling user cellular phone devices to eliminate hardware components otherwise required for support for each of multiple, different network technologies (LTE, CDMA, etc.)

An authentication component 242 authenticates user end devices (mobile telephones) to access other modules of the control plane 201, such as the SIM manager 240, a profile manager 244, etc.; it also authenticates a given network 220 to reach a desired client 208.

A profile manager 244 manages an end user's profile and enables the user to set call settings and preferences (at 102, FIG. 4). Thus, a user is enabled to set a preference in his or her profile to make all calls after a designated time (for example, 10 PM) via a packet switching network. Generally the user can access the control plane 201 via the profile manager 244 via username and password entry from any device (such as the laptop 211), to thereby set or revise profile settings to be applied to calls as designated.

An inter cloud connector 246 provides flexibility by enabling the control plane 201 to be connected to other clouds (not shown) serving different regions of a network.

An application manager 248 abstracts mobile applications to the control plane so that users can access their own instance from any device with his or her login.

An application status manager 250 processes mobile application control information, for example, including showing an incoming message, relevant stock market ticker updates, etc. Data and status change updates, such as received from a given BSS 222, may thereby be shared via the control plane 201 periodically or in response to establishing a connection to a specific base tower.

A video control manager 252 selectively shares video data and selections, for example broadcasting only bits of video data that have changed since a last screen refresh for display on a corresponding portion of screen of a user's mobile device, rather than driving a refresh of the entire screen.

Providing some cellular service functionalities under the prior art generally requires a large variety of dedicated core components within cell phone devices that may expand the physical size or form factor of the mobile device, and that also may not be easily replaced to meet changing cellular provider requirements. Thus, prior art cell phone design standards generally tightly couple component selection to dedicated functionalities. For example, adding CDMA capabilities to a cell phone designed for GSM connections may require changes to hardware components in the cell phone. "Smart phones" that provide application processing (email clients, internet browsing and other applications) may have to support complex processor structures able to run parallel business applications, which may in turn require robust battery components that are able to supply sufficient power for long time periods between re-charging periods.

In contrast, aspects of the present invention migrate control plane and other functions from the responsibility of components within the user's mobile cellular phone to cloud and other external resources. End user cellular phones thereby function as input/output devices connecting to cloud-based components that serve as the interface of the phone to different cellular provider networks, and wherein storage and other processing tasks may also be done (abstracted) in the cloud. By performing network selection, analysis and switching in external, cloud-based control plane structures 201, aspects enable users to access provider networks with cell phone equipment that is thinner relative to equipment required in prior art system and process devices. Memory, processor, and battery resources needed to support said user equipment may also be reduced considerably relative to prior art systems.

Prior art end user mobile phone designs are generally limited in supporting hardware flexibility to support future enhancements. For example, prior art mobile devices generally cannot tune to both radio waves and microwaves at the same time, and cannot generally switch between networks having different cellular signal encoding standards to suit users' preferences. By externalizing these components and functions via the control plane 201, a mobile phone device according to the present invention need only connect to the control plane 201, wherein the different components needed to connect to the different cellular signal encoding standards may be selected and used via the control plane and may be external to the user's phone.

Thus, virtualization of cellular networks is enabled by aspects of the present invention, supporting increasing customer demand, elasticity, and on-demand infrastructure sharing, with each network element divided into control plane and data plane with multi-tenant, cloud-based arrangements.

As the complex functionalities are decoupled from the mobile phone and network and are managed by units in the cloud, battery power needed to operate phones in aspects of the present invention are decreased, and network management becomes simpler. Where mobile and network control planes have revisable and switchable components, upgrading to enable future technologies does not require replacement of end user mobile phones that are able to communicate with the control plane 201: for example, a same mobile phone can be used for radio wave frequency and micro wave frequency communications via the control plane 201.

Aspects may also enable users to make calls originating from his unique number via any device that has a microphone, speaker, and internet connection to the control plane 201 (wireless or wired), thus making the architecture end user device agnostic.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for dynamically switching between different cellular service providers during a cellular call, comprising executing on a computer processor the steps of:
   establishing a cellular phone call from an end user device to another user on a first cellular service provider that is selected in response to having performance attributes that meet each of a set of a plurality of different boundary attribute values that are specified for execution of the cellular phone call;
   revising one of the boundary attribute values to generate a revised set of the plurality of different boundary attribute values; and
   while maintaining the established cellular phone call from the end user device to the another user without dropping the established call or a connection of the end user to the established call, automatically switching the established cellular phone call to a second cellular service provider that is different from the first cellular service provider in response to determining that the performance attributes of the first cellular service provider do not meet the revised set of boundary attribute values and that performance attributes of the second cellular service provider meet the revised set of boundary attribute values, wherein the first and the second cellular service providers use different cellular signal encoding standards.

2. The method of claim 1, further comprising:
   integrating computer-readable program code into a computer system comprising a processor, a computer readable memory and a computer readable storage medium, wherein the computer readable program code is embodied on the computer readable storage medium and comprises instructions that, when executed by the processor via the computer readable memory, cause the processor to perform the steps of establishing the cellular phone call from the end user device to the another user on the first cellular service provider selected in response to having performance attributes that meet each of the set of a plurality of different boundary attribute values that are specified for execution of the cellular phone call, and automatically switching the established cellular phone call to the second cellular service provider while maintaining the established cellular phone call from the end user device to the another user without dropping the established call or the connection of the end user to the established call.

3. The method of claim 2, wherein the computer-readable program code is provided as a service in a cloud environment.

4. The method of claim 1, further comprising:
   in response to determining that current performance attributes of the second cellular provider are failing to meet the revised set of boundary attribute values and that the performance attributes of a third cellular service provider that is different from the second cellular service provider meet the revised set of boundary attribute values, while maintaining the established cellular phone call from the end user device to the another user without dropping the established call or the connection of the end user to the established call, automatically switching the established cellular phone call to the third cellular service provider, wherein the second and the third cellular service providers use different cellular signal encoding standards.

5. The method of claim 4, wherein the first, second and third cellular service providers use different ones of cellular signal encoding standards for establishing the cellular phone call that are selected from a group of cellular signal encoding standards consisting of time division multiple access, frequency division multiple access, code division multiple access, orthogonal frequency division multiple access, high speed packet access, public data network, long-term evolution, global system for mobile communications and third-generation mobile networks encoding standards.

6. The method of claim 5, further comprising:
establishing the cellular phone call and automatically switching the established cellular phone call to the second cellular service provider while maintaining the established cellular phone call from the end user device to the another user without dropping the established call or the connection of the end user to the established call, via a control plane unit that is provided as a service in a cloud environment and that is configured to establish the cellular phone call via multiple different ones of the group of cellular signal encoding standards.

7. The method of claim 6, wherein the plurality of different boundary attribute values are selected from the group consisting of a priority setting for the call, an acceptable packet loss setting, an assured bandwidth value, a jitter value, and a preferred one of the cellular signal encoding standards.

8. The method of claim 7, further comprising:
switching from a packet switching domain to a different domain for processing data of the established cellular phone call, while maintaining the established cellular phone call from the end user device to the another user without dropping the established call or a connection of the end user to the established call.

9. A system, comprising:
a processor;
a computer readable memory in circuit communication with the processor; and
a computer readable storage medium in circuit communication with the processor;
wherein the processor executes program instructions stored on the computer-readable storage medium via the computer readable memory and thereby:
establishes a cellular phone call from an end user device to another user on a first cellular service provider that is selected in response to having performance attributes that meet each of a set of a plurality of different boundary attribute values that are specified for execution of the cellular phone call;
revises one of the boundary attribute values to generate a revised set of the plurality of different boundary attribute values; and
while maintaining the established cellular phone call from the end user device to the another user without dropping the established call or a connection of the end user to the established call, automatically switches the established cellular phone call to a second cellular service provider that is different from the first cellular service provider in response to determining that the performance attributes of the first cellular service provider do not meet the revised set of boundary attribute values and that performance attributes of the second cellular service provider meet the revised set of boundary attribute values, and wherein the first and the second cellular service providers use different ones of cellular signal encoding standards.

10. The system of claim 9, wherein the processor executes the program instructions stored on the computer-readable storage medium via the computer readable memory and thereby, in response to determining that current performance attributes of the second cellular provider are failing to meet the revised set of boundary attribute values and that the performance attributes of a third cellular service provider that is different from the second cellular service provider meet the revised set of boundary attribute values, while maintaining the established cellular phone call from the end user device to the another user without dropping the established call or the connection of the end user to the established call, automatically switches the established cellular phone call to the third cellular service provider, wherein the second and the third cellular service providers use different cellular signal encoding standards.

11. The system of claim 10, wherein the first, second and third cellular service providers use different ones of cellular signal encoding standards for establishing the cellular phone call that are selected from a group of cellular signal encoding standards consisting of time division multiple access, frequency division multiple access, code division multiple access, orthogonal frequency division multiple access, high speed packet access, public data network, long-term evolution, global system for mobile communications and third-generation mobile networks encoding standards.

12. The system of claim 11, wherein the processor executes the program instructions stored on the computer-readable storage medium via the computer readable memory and thereby establishes the cellular phone call and automatically switches the established cellular phone call to the second cellular service provider while maintaining the established cellular phone call from the end user device to the another user without dropping the established call or the connection of the end user to the established call, via a control plane unit that is provided as a service in a cloud environment and that is configured to establish the cellular phone call via multiple different ones of the group of cellular signal encoding standards.

13. The system of claim 12, wherein the plurality of different boundary attribute values are selected from the group consisting of a priority setting for the call, an acceptable packet loss setting, an assured bandwidth value, a jitter value, and a preferred one of the cellular signal encoding standards.

14. The system of claim 13, wherein the processor executes the program instructions stored on the computer-readable storage medium via the computer readable memory and thereby switches from a packet switching domain to a different domain for processing data of the established cellular phone call, while maintaining the established cellular phone call from the end user device to the another user without dropping the established call or a connection of the end user to the established call.

15. A computer program product for dynamically switching between different cellular service providers during a cellular call, the computer program product comprising:
a computer readable storage medium having computer readable program code embodied therewith, wherein the computer readable storage medium is not a transitory signal per se, the computer readable program code comprising instructions for execution by a processor that cause the processor to:
establish a cellular phone call from an end user device to another user on a first cellular service provider that is selected in response to having performance attributes that meet each of a set of a plurality of different boundary attribute values that are specified for execution of the cellular phone call;

revise one of the boundary attribute values to generate a revised set of the plurality of different boundary attribute values; and while maintaining the established cellular phone call from the end user device to the another user without dropping the established call or a connection of the end user to the established call, automatically switch the established cellular phone call to a second cellular service provider that is different from the first cellular service provider in response to determining that the performance attributes of the first cellular service provider do not meet the revised set of boundary attribute values and that performance attributes of the second cellular service provider meet the revised set of boundary attribute values, and wherein the first and the second cellular service providers use different ones of cellular signal encoding standards.

16. The computer program product of claim 15, wherein the computer readable program code instructions for execution by the processor further cause the processor to, in response to determining that current performance attributes of the second cellular provider are failing to meet the revised set of boundary attribute values and that the performance attributes of a third cellular service provider that is different from the second cellular service provider meet the revised set of boundary attribute values, while maintaining the established cellular phone call from the end user device to the another user without dropping the established call or the connection of the end user to the established call, automatically switch the established cellular phone call to the third cellular service provider, wherein the second and the third cellular service providers use different cellular signal encoding standards.

17. The computer program product of claim 16, wherein the first, second and third cellular service providers use different ones of cellular signal encoding standards for establishing the cellular phone call that are selected from a group of cellular signal encoding standards consisting of time division multiple access, frequency division multiple access, code division multiple access, orthogonal frequency division multiple access, high speed packet access, public data network, long-term evolution, global system for mobile communications and third-generation mobile networks encoding standards.

18. The computer program product of claim 17, wherein the computer readable program code instructions for execution by the processor further cause the processor to establish the cellular phone call and automatically switch the established cellular phone call to the second cellular service provider while maintaining the established cellular phone call from the end user device to the another user without dropping the established call or the connection of the end user to the established call, via a control plane unit that is provided as a service in a cloud environment and that is configured to establish the cellular phone call via multiple different ones of the group of cellular signal encoding standards.

19. The computer program product of claim 18, wherein the plurality of different boundary attribute values are selected from the group consisting of a priority setting for the call, an acceptable packet loss setting, an assured bandwidth value, a jitter value, and a preferred one of the cellular signal encoding standards.

20. The computer program product of claim 19, wherein the computer readable program code instructions for execution by the processor further cause the processor to switch from a packet switching domain to a different domain for processing data of the established cellular phone call, while maintaining the established cellular phone call from the end user device to the another user without dropping the established call or a connection of the end user to the established call.

* * * * *